Patented Apr. 12, 1927.

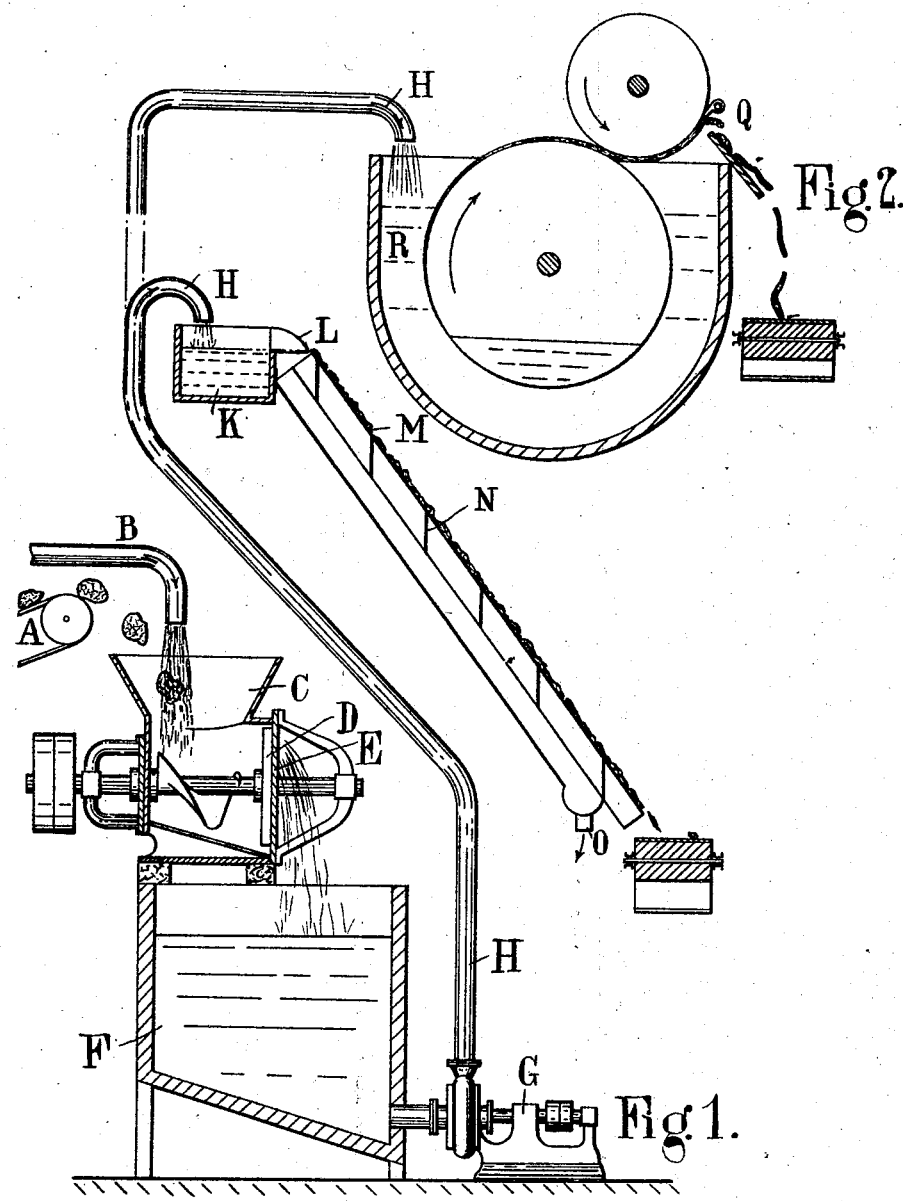

1,624,769

UNITED STATES PATENT OFFICE.

OLOF SÖDERLUND AND TEOFRON BOBERG, OF CLAPHAM PARK, AND NILS TESTRUP, OF WESTMINSTER, LONDON, ENGLAND, ASSIGNORS TO TECHNO-CHEMICAL LABORATORIES, LIMITED, OF LONDON, ENGLAND.

REMOVAL OF WATER FROM PEAT AND THE LIKE.

Application filed September 30, 1924, Serial No. 740,870, and in Great Britain November 7, 1923.

This invention relates to the removal of water from peat and like moisture-containing matter by methods employing the prior addition of considerable quantities of water thereto.

According to the present invention large quantities of water are mixed with the peat so that the solid content of the mixture is reduced to somewhere in the neighbourhood of some 2 per cent and it is then possible to adequately disperse or disseminate the solid particles consisting mainly of fibre and associated colloids so that the latter or slimy gel constituent will readily separate with the bulk of the water from the other mainly fibrous solids and if suitable conditions be fulfilled a proportion of the ash can also be separated. When the slimy gel has been separated with the readily separable water the fibrous constituents remaining part very readily in a second separation from the water they still contain by simple pressure and the output of pressing appliances, especially such as can be used to press untreated peat, e. g. those of United States application Serial No. 660,234 in which endless bands passing between resiliently supported rollers subject thin layers of the material to heavy pressure is greatly increased.

This invention therefore consists in processes and apparatus for separating water from peat and like materials having one or more of the following features:—

(1) Removal of the slimy gel constituent of the material by suitable admixture with sufficient water and subsequent separation of water and gel from the mixture as by straining, decantation or the like.

(2) Separation of part of the ash from the mixture in connection with the operations of (1).

(3) Pressing of the residue of (1) preferably in a press of the type which spreads the material in thin layers as described above.

(4) Drying of the press product preferably by evaporation as by direct contact with hot waste gases.

The invention further consists in dispersing raw or macerated peat in a volume of water large compared with the volume of the said peat and preferably from 5 to 20 times the said volume, separating the peat solids from the gelatinous or slimy constituents and surplus water by settlement, screening, decantation, centrifuging or other methods, preferably in a continuous manner, and pressing the wet separated peat preferably in a continuous press, and finally hot gas drying the press product.

In carrying this invention into effect in one form as applied, by way of example, to the production of a dense fuel from peat, the peat excavated from an undrained bog is, either with or without maceration, mixed by stirring with water in such quantity as will disperse the gelatinous or slimy constituent and render the remaining solids readily separable therefrom, as by settling and decantation or by screening, and preferably in continuous acting apparatus. The dilution with water should for the best results be taken up to, say, the neighbourhood of 98 to 99 per cent and the mixture is then, in one form of apparatus, run down over an inclined screening device similar to that used for preliminary water separation in the paper pulp industry. It is found that most of the water and the bulk of the slimy matter flow off and the residual peat solids and remaining water pass on over the screen and are delivered to the feeding chambers of a multiple band press of the type before indicated as preferable for squeezing liquid of low gel content from the fibrous part of peat. The ash may be separated by settlement at a point just preceding the screen separation.

Referring now to the accompanying drawings:—

Figure 1 is a diagrammatic representation of one kind of apparatus for operating in accordance with this invention, and Figure 2 shows an alternative arrangement of part of the installation.

In the apparatus for carrying out the invention illustrated in Figure 1, raw peat A and water B are led in together into a mixer C in the proportion of, say, 1 part dry substance to 50 to 100 parts of water. Here the peat and water are thoroughly mixed together and allowed to pass through a perforated plate E in front of which rotating knives D are keeping the orifices in the plate clean from long fibres, which are cut up into shorter lengths and passed through the orifices together with the slurry into a collecting tank F. From this tank the slurry is pumped by the pump G through the pipe H to a distributing trough K and from this trough through the spouts L over an inclined screen M.

The screen M may be made of wire gauze, preferably phosphor bronze or copper of about 60 mesh, stretched over a structure and provided with a number of vertically arranged baffles N.

Flowing down the screen the peat slurry is subjected to primary separation, the water and colloidal solid matter flowing through the gauze and being collected underneath the screen in a trough and discharged through piping O. The bulk of the fibrous peat rolls down the screen to a conveyor and contains now some 95 per cent of water and is very suitable for further dewatering in presses of any suitable kind which as indicated have a plurality of bands which divide the peat fibre into thin layers so that the liquid may be readily extruded when the layers and bands are subjected to heavy pressure between resiliently supported rollers.

In the event of a drier product being required for the presses, a pulp thickener may be used instead of the screen and such pulp thickener may be of a kind used in the paper industry and consist of a cylinder S, as shown diagrammatically in Figure 2, rotating in a trough R.

The peripheral wall or mantle S' of the cylinder is made of a perforated plate over which may be stretched a finer wire gauze. The slurry is delivered to the machine by the pipe H and kept at so high a level in the trough R as is convenient for the picking up roller T to clear the slurry. As the cylinder S is rotating in the direction shown by the arrow there will be formed a film or layer of thicker pulp on the cylinder's surface as the water passes through this layer and the wire gauze into the drum where it is drained off through the ends of the drums. As this layer passes into the grip between the cylinder S and the picking up roller T more water will be expelled and the dry pulp will stick to the roller T, leaving the wire gauze on the drum clean. From the roller it is scraped off by the scraper Q and is from there taken away for further pressing.

It has been found that the more water used in the slurry the more pressable will the product become, but on the other hand it has also been found that losses of dry material will increase with the increased amount of discharged water.

It is found that by this process the solid output which may be obtained from presses is very greatly increased over that obtained with the undiluted peat and that such matter as may be laterally extruded by the press can be usefully returned direct to the mixing devices.

The product of the press may be dried further by introduction into waste flue gases, e. g. as described in British Patent No. 150,807 of June 6th, 1919, according to which the peat after being partly dried is in a finely divided state subjected to further heating and drying by hot furnace gases in a current of which the material is suspended and then carried to any desired location for further treatment.

Having now described our invention, what we claim as new and desire to secure by Letters Patent is:—

1. A method of reducing peat to matter from which the liquid can subsequently be largely extruded by pressure comprising adding a quantity of water which will reduce the solid matter to not more than 2 per cent of the mass, thoroughly mixing the mass and shortening any extended fibres, carrying the mass over perforated surfaces through which the water and contained slimy constituents can pass and collecting the matter from said perforated surfaces.

2. A method of reducing peat to matter from which the liquid can subsequently be largely extruded by pressure comprising adding a quantity of water which will reduce the solid matter to not more than 2 per cent of the mass, subjecting the mass to a breaking-up process, carrying the mass over perforated surfaces of about 60 mesh and collecting the matter which remains upon said perforated surfaces.

3. A method of obtaining peat matter of small liquid content comprising adding a quantity of water which will reduce the solid matter to not more than 2 per cent of the mass, thoroughly mixing the mass and shortening any extended fibres, carrying the mass over perforated surfaces through which the water and contained slimy constituents can pass, collecting the matter from said perforated surfaces and pressing said matter into thin layers between separating surfaces to extrude liquid therefrom.

4. A method of obtaining peat matter of small liquid content comprising adding a quantity of water which will reduce the solid matter to not more than 2 per cent of the mass, thoroughly mixing the mass and shortening any extended fibres, carrying the mass over perforated surfaces through which the water and contained slimy constituents can pass, collecting the matter from said perforated surfaces, pressing said matter into thin layers between separating surfaces to extrude liquid therefrom and adding said extruded liquid with the water employed to first reduce the solid content.

5. A method of obtaining peat matter of small liquid content comprising adding a quantity of water which will reduce the solid matter to not more than 2 per cent of the mass, thoroughly mixing the mass and shortening any extended fibres, carrying the mass over perforated surfaces through which the water and contained slimy constituents can pass, collecting the matter from said perforated surfaces, pressing said matter into thin layers between separating surfaces to extrude liquid therefrom and then carrying the matter of said layers suspended in a current of hot gas.

In testimony whereof we have signed our names to this specification.

OLOF SÖDERLUND.
TEOFRON BOBERG.
NILS TESTRUP.